United States Patent
Pressianov et al.

[11] Patent Number: 5,225,673
[45] Date of Patent: Jul. 6, 1993

[54] APPARATUS FOR MEASURING THE TIME-INTEGRATED VOLUME SPECIFIC ACTIVITIES AND THE POTENTIAL ALPHA ENERGY OF RADON AND THORON DAUGHTERS IN THE AIR

[75] Inventors: Dobromir S. Pressianov; Metodi G. Geilev; Orlin Y. Penchev, all of Sofia, Bulgaria

[73] Assignee: Firma Naturella - Group Ltd., Sofia, Bulgaria

[21] Appl. No.: 816,763

[22] Filed: Jan. 2, 1992

[30] Foreign Application Priority Data

Jan. 4, 1991 [BG] Bulgaria .................. 93 584

[51] Int. Cl.⁵ .................... G01T 7/04
[52] U.S. Cl. .................... 250/255; 250/435
[58] Field of Search ......... 250/255, 432 R, 435, 250/304, 364, 370.02

[56] References Cited

U.S. PATENT DOCUMENTS 4,013,888 3/1977 Macias et al. ............ 250/435
4,701,621 10/1987 Kaiser et al. ............ 250/435

FOREIGN PATENT DOCUMENTS 0044376 3/1983 Japan ................. 250/304
0144769 8/1983 Japan ................. 250/304

*Primary Examiner*—Carolyn E. Fields
*Assistant Examiner*—Drew A. Dunn
*Attorney, Agent, or Firm*—Michael Marinangeli; Thomas A. Gallagher

[57] ABSTRACT

An apparatus for determining the time-integrated volume specific activities of radon and thoron daughters without the participation of an operator during the measurement includes an air pump connected to a perpendicularly disposed pipe with plugged ends provided with two longitudinal rectangular orifices which are in contact with two endless aerosol filter bands which are rotated by a clock mechanism at periods of 1 hour and 12 hours respectively. Radiation detectors are disposed in seats of a cylindrical support while the latter is disposed within a protective housing.

3 Claims, 2 Drawing Sheets

APPARATUS FOR MEASURING THE TIME-INTEGRATED VOLUME SPECIFIC ACTIVITIES AND THE POTENTIAL ALPHA ENERGY OF RADON AND THORON DAUGHTERS IN THE AIR

FIELD OF THE INVENTION

This invention relates to an apparatus for measuring the time-integrated volume specific activities and the potential alpha energy of radon and thoron daughters in the air which can find application in the dosimetric control of uranium and polymetal mines, the radiation monitoring of environment and in scientific research.

BACKGROUND OF THE INVENTION

A known apparatus for determining the potential alpha energy of radon daughters in the air is disclosed in Frank, A. L., E. V. Benton.-*Nucl. Track Detection*, 1, 149 (1977). This known apparatus comprises a fixed aerosol filter on which, because of the continuous aspiration of air, there are deposited aerosols containing radon and thoron daughters. The radiations of the radon and thoron daughters are recorded by two solid-state trace detectors. Between the detectors and the filters there are disposed absorbers of different thickness, which reduce the energy of the alpha particles to limits suitable for measurement. On the basis of the indications of both detectors, the potential alpha energy of the radon daughters are determined by means of formulas.

The disadvantages of this known apparatus lie in its low productivity. The filter must be replaced frequently and the volume specific activities of the radon daughters and the volume specific activites and the potential alpha energy of the thoron daughters are not determined separately.

Another known apparatus for measuring the potential alpha energy of radon daughters an the air is disclosed in Solomon, S. R.. et al.-*Health Phys.*, v.52, 143 (1987). This known apparatus comprises an aerosol filter, clamped between two rings. in each of which there is mounted a thermoluminescent detector in the form of a disk with a round hole in the center. This configuration is mounted in a cylindrical housing (head) consisting of two parts, interconnected by means of a fastening thread. The one end of the housing is connected to an air pump, while the other is provided with a hole for sucking in air. On the basis of the indications of the detectors, the potential alpha energy of the radon daughters is determined by means of formulas or graphs. The share of the thoron daughters is determined as follows: after the measuring of the potential alpha energy of the radon daughters, the aerosol filter is removed, a new head with new thermoluminescent detectors is mounted and, on the basis of their indication after 24 hours, the share of the indications of the thermoluminescent detectors due to the thoron daughters is determined.

The drawbacks of this known apparatus lie in its limited functional possibilities. The volume specific activities of the radon and the volume specific activities and the potential alpha energy of the thoron daughters in the air are not determined separately. The filter requires frequent replacement and additional operations are required for taking into account the influence of the thoron daughters. Moreover, this apparatus exhibits low accuracy due to systematic error as a result of the dependence of the detector indications on the differences in the relations of the volume specific activities of the radon daughters (at constant potential alpha energy).

It is therefore a general object of this invention to develop an apparatus for measuring the time-integrated volume specific activities and the potential alpha energy of radon and thoron daughters in the air, which has wide functional possibilities, high productivity and high accuracy.

SUMMARY OF THE INVENTION

These objects and others are achieved by the inventive apparatus for measuring the time-integrated volume specific activities and the potential alpha energy of radon and thoron daughters in the air which comprises two aerosol filters disposed within a protective housing. These filters are shaped as endless surfaces, symmetric with respect to their axis of rotation. Each filter is rigidly fastened to a respective small cylindrical wheel, one of which is rigidly connected to an elongated minute hand axle of a clock mechanism, and the other to the hour hand axle of this same mechanism. These axles of the clock mechanism coincide with the axles of the cylindrical wheels and with the geometric axes of the filters. On the one side of each filter and opposite to it, on a support of geometric shape similar to that of the filters which is fixed with respect to the housing, there is disposed a respective group of detectors, while the other filter surface is in contact with a respective inlet nozzle, connected via a conduit passing through holes in the protective housing to an air pump.

In one embodiment of the apparatus, the filters and the support of the detectors are of cylindrical shape, while the nozzles of the pump are disposed on a T-shaped pipe passing also through a hole in the support.

In a second embodiment of the apparatus the filters are shaped as disks, the supports are shaped as disks with a hole in the center, and the nozzles of the pump are disposed on a U-shaped pipe.

The apparatus according to the invention is featured by the following advantages:

widened functional possibilities because of the ability to determine the time-integrated volume specific activities of any of the radon and thoron daughters;

a high productivity because of the autonomous operation of the apparatus (without participation of an operator and without filter recharging) for several weeks in mine conditions and up to several months in conditions of residential buildings;

a high accuracy because of the use of a great number of detectors, this resulting in a reduction of the statistical error and in the elimination of systematic errors due to differences in the relation of the volume specific activities;

an additional advantage of the second embodiment of the apparatus lies in the use of the more accessible disk-type aerosol filters, as well as an the fact that the detectors are disposed in one plane on a flat disk-shaped support, and this makes possible the use of automated measuring devices.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
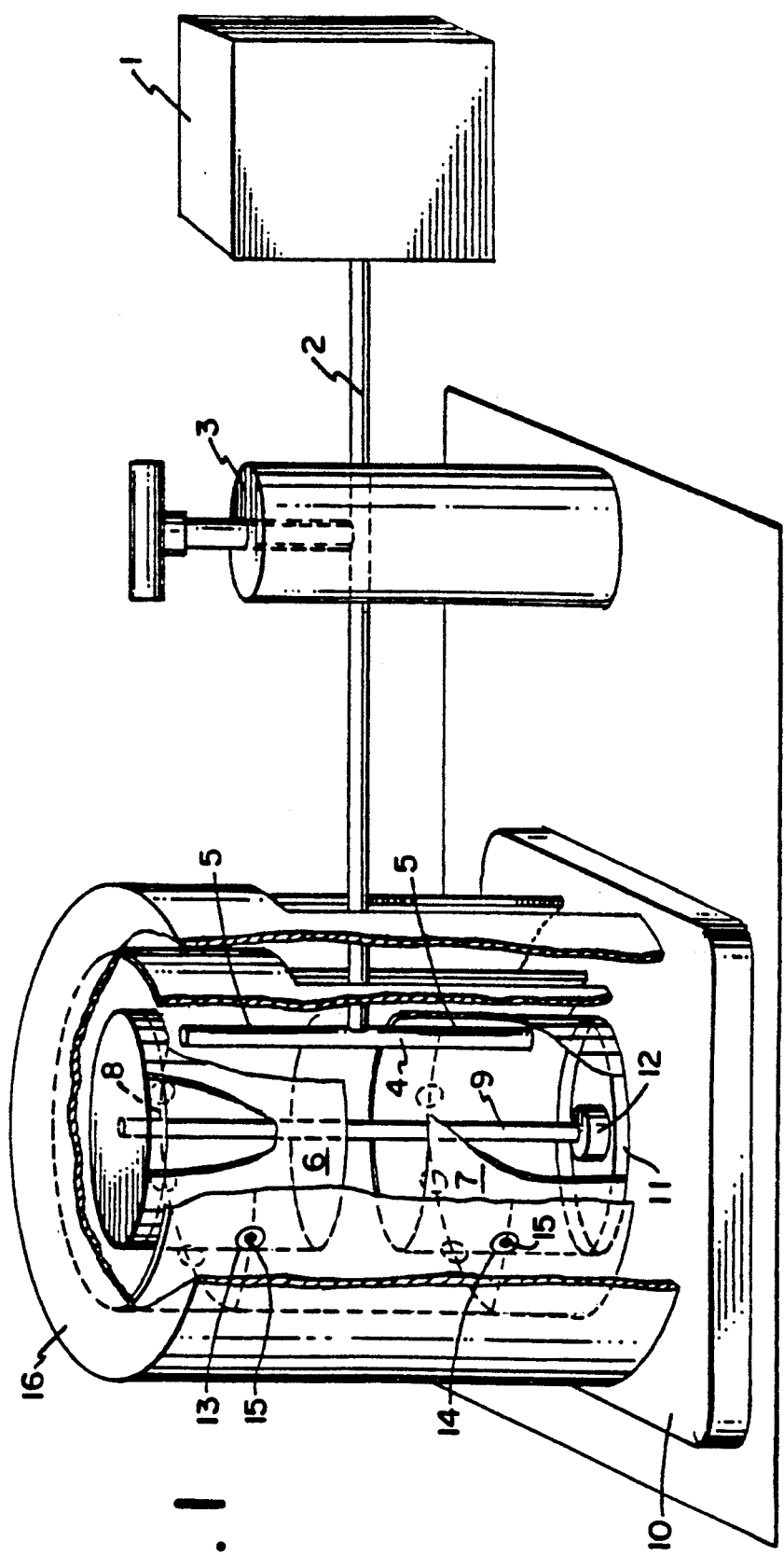
FIG. 1 is a partially cut-away perspective view of a first embodiment of the apparatus according to the invention.

Referring now to FIG. 1, the first embodiment of the invention comprises a pump 1, the inlet of which is connected to one end of a pipe 2 seated in a holder 3. The other end of the pipe 2 is hermetically connected to the central portion of a perpendicularly disposed pipe 4. The ends of this pipe 4 are plugged, and in the sides of it there are cut-out two longitudinal rectangular orifices 5. Each of the orifices 5 is in contact with a respective endless aerosol filter band 6, 7 shaped as a cylinder.

One end of the filter band 6 is connected rigidly to the periphery of a small cylindrical wheel 8, which is rigidly connected to the elongated minute hand axle 9 of a clock mechanism 10.

One end of filter band 7 is connected rigidly to the periphery of a small cylindrical wheel 11, which is rigidly connected to the hour hand axle 12 of the clock mechanism 10.

On the outer side of both endless aerosol filter bands 6 and 7 there is disposed a cylindrical support 13 fixed with respect to the pipe 4. This support 13 is provided with two circular rows of seats with through holes 14 in which there are disposed the radiation detectors 15, which can be passive radiation detectors (such as thermoluminescent detectors, solid state detectors of traces, e.g.).

Each row of seats 14 is centered with respect to the respective rectangular orifice 5 of pipe 4. Outside the cylindrical support 13 there is provided a protective housing 16 for protection from light, electromagnetic and mechanical effects.

Figure 2:
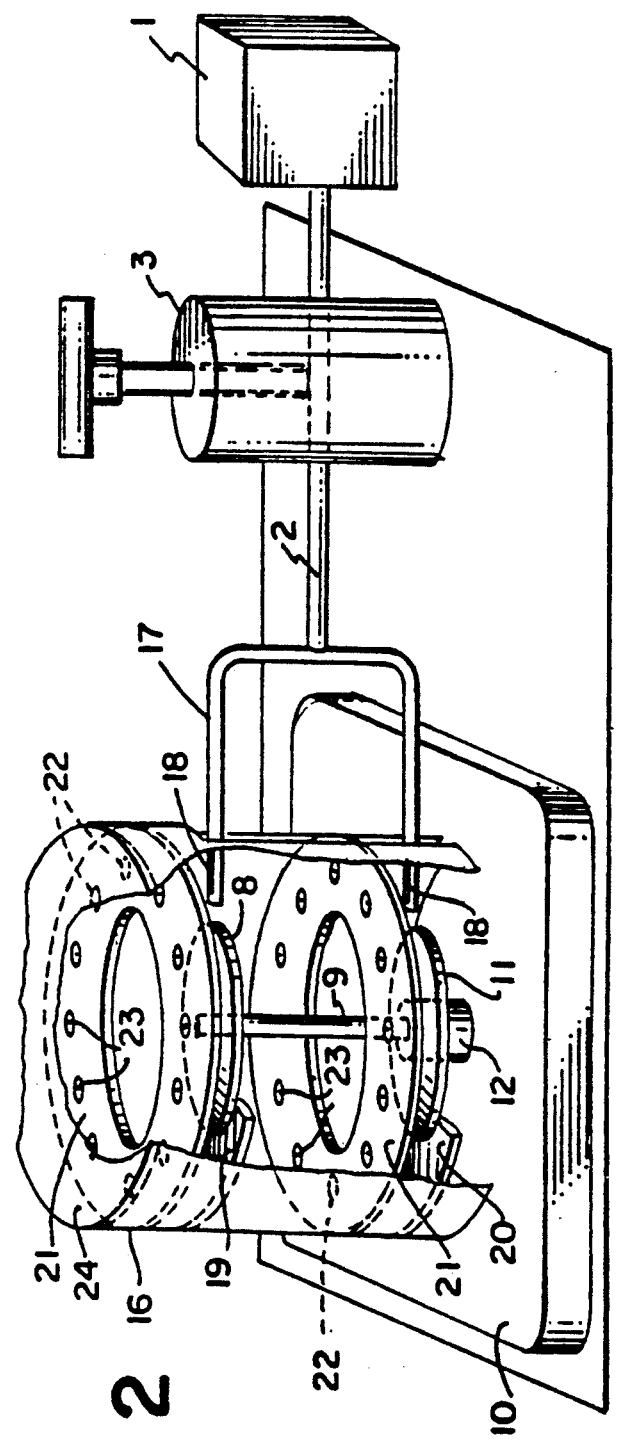
FIG. 2 is a similar view of a second embodiment of the apparatus according to the invention.

Referring now to FIG. 2, the second second embodiment of the apparatus also comprises a pump 1, the inlet of which is connected with one end of a pipe 2, seated in a holder 3.

In this embodiment, the other end of the pipe 2 is hermetically connected .to a central portion of a U-shaped pipe 17, the ends of which are plugged.

In the upper sides of both horizontal portions of the U-shaped pipe 17 there are cut-out two longitudinal rectangular orifices 18.

Each of these orifices 18 is in contact with a respective disk-type aerosol filter 19, 20.

The filter 19 is connected rigidly and centered to a small cylindrical wheel 8, which is rigidly connected to the elongated minute hand axle of a clock mechanism 10.

The filter 20 as connected rigidly and centered to a cylindrical small wheel 11, which is rigidly connected to the hour hand axle 12 of the clock mechanism 10.

Above the filters 19 and 20 there are disposed and fixed with respect to the pipe 17 disk-shaped supports 21, having rows of seats 22 in which there are disposed the radiation detectors 23.

Each row of seats 22 is centered with respect to the respective rectangular orifice 18 of the U-shaped pipe 17.

On the outer side of the filters there is provided a protective housing 16 for protection from light, electromagnetic and mechanical effects, and a cover 24 which can be removed.

In a simplified, but frequently met in practice case, when only radon daughters are present in the air, it is possible to use a simplified design without the filter connected to the hour axle and the respective group of detectors, i.e. it will contain only one filter and one group of detectors.

Referring generally now to both FIGS. 1 and 2, the operation of the apparatus according to the invention will be described in detail:

The pump 1 sucks in air through the pipe 2 through both filters 6, 7 or 19, 20 via the two longitudinal orifices 5 or 18 of the pipe 4 or 17.

In the zone of sucking-in there are deposited on the filters 6, 7 or 19, 20 aerosols which contain radon and thoron daughters. The one filter 6 or 19 rotates together with the small wheel 8 with the same speed as that of the minute hand on the axle 9 of the clock mechanism 10, while the other filter 7 or 20 rotates together with the small wheel 11 with the same speed as that of the hour hand on the axle 12 of the clock mechanism 10.

The radioactive radiation of the aerosols irradiates the detectors 15 or 23, which have been placed previously in the seats 14 or 22 so that the sensitive surface of each detector 15, 23 is turned towards the respective filter 6, 7, 19, 20.

The sucking-in of air continues for a time interval necessary for the determination of the time-integrated volume specific activities and the potential alpha energy of the radon and thoron daughters. After the end of aspiration, a waiting time of not less than 24 hours is imposed (this is necessary for the decay of most of the radon and thoron daughters deposited on the filters), and then the housing 16 and the supports 13, 21 are disassembled, and the latter are removed with the object of measuring the detectors 15, 23, and new detectors are placed in their seats. The aerosol filters are then replaced by new ones.

In the first embodiment of the apparatus (FIG. 1) the operation of filter replacement begins with the disassembly of the housing 16 and the cylindrical support 13. The holder 3 is loosened and the pipe 2 as moved together with the pipe 4 in direction towards the axle 9, it is then rotated 90° and the pipe 4 takes a position parallel to the gap formed between the free ends of both filter bands 6 and 7. The pipe 2 is pulled together with the pipe 4 in direction towards the holder 3 and the small cylindrical wheel 8 is removed from the axle 9. Then the wheel 11 is removed from the axle 12 and is taken out through axle 9.

The aerosol filter bands 6 and 7 are replaced by new ones and then the apparatus is assembled and fitted in reverse order.

In the second embodiment of the apparatus (FIG. 2) the replacement begins by loosening the holder 3 and the pipes 2 and 17 are pulled out. The cover 24 is removed, the top disk-shaped support 21 is removed, the small wheel 8 is removed together with the filter 19 from the axle 9, the bottom disk-shaped support 21 is removed, and then the small wheel 11 with the filter 20 are removed from the axle 12.

The aerosol filters are replaced by new ones and the apparatus is assembled and fitted in reverse order.

The signal accumulated by the detectors is measured by means of a measuring device. Since the angles at which the inlet nozzle is disposed with respect to the detectors and the signal measured by each detector are known, it is possible using formulas deduced on the basis of the laws of radioactive decay and accumulation using the principle described in Raabe O. G., M. E. Wrenn., *Health Phys.*, v.17, 593 (1969) to determine the time-integrated volume specific activities of the daughters of radon ($218_{Po}$, $214_{Pb}$ and $214_{Bi}$) and thoron ($212_{Pb}$ and $212_{Bi}$) and the respective potential alpha energies, which are known functions of the former.

For the unambiguous determination of the five unknown time-integrated volume specific activities there are necessary at least five detectors. However, in order to minimize the statistical error an their determination, it is desirable to use a greater number of detectors—at least six for each filter.

The maximum time for sucking-in air is limited by the accumulation of dust on the filter. It is for mines of from 100 (at total dust loading above 10 mg/m$^3$) to 1000 (at total dust loading 1 to 2 mg/m$^3$) hours, and in residential premises—up to ten times longer.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. An apparatus for measuring the time-integrated volume specific activities and the potential alpha energy of radon and thoron daughters in the air, comprising
   two aerosol filters disposed within a protective housing;
   radiation detectors disposed opposite to the filters and fixed with respect to the housing;
   a pump, having two inlet nozzles which are proximate with a respective first surface of each filter;
   said aerosol filters having endless surfaces and being symmetric to their axis of rotation;
   said filters being fixed with respect to respective axles rotating at different speeds;
   each axle being coaxial with the geometric axis of the respective filter;
   said detectors being arranged in two groups, disposed on a support of geometric shape similar to that of the filters, and each group being disposed opposite to a second surface of the respective filter, the first surface of which is in contact with the respective inlet nozzle of the pump via a pipe passing through a hole in the protective housing.

2. An apparatus as claimed in claim 1, wherein the filters and the support and the detectors are of cylindrical shape, and the nozzles of the pump are disposed on a T-shaped pipe.

3. An apparatus as claimed in claim 1, wherein the filters are shaped as disks, the supports of the detectors are shaped as a disk with a hole in the center, and the nozzles of the pump are disposed on a U-shaped pipe.

* * * * *